April 19, 1949.　　　　　P. GLASS　　　　　2,467,974
ELECTRICAL CONTROL CIRCUIT
Filed May 19, 1944　　　　　　　　　　　　2 Sheets-Sheet 1
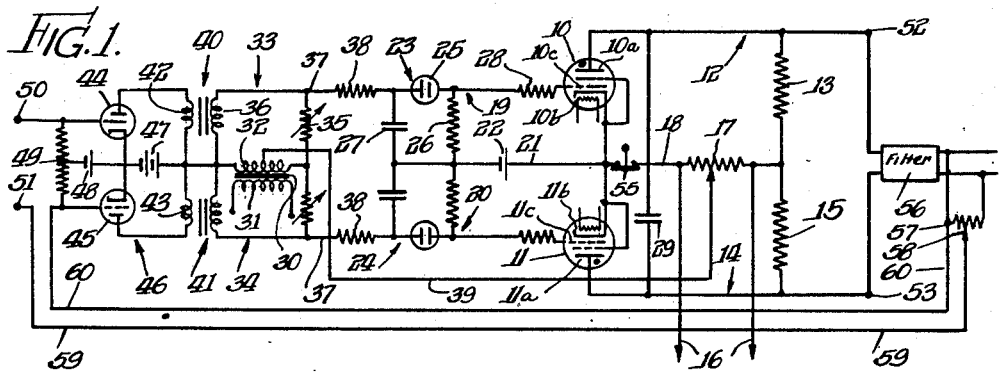
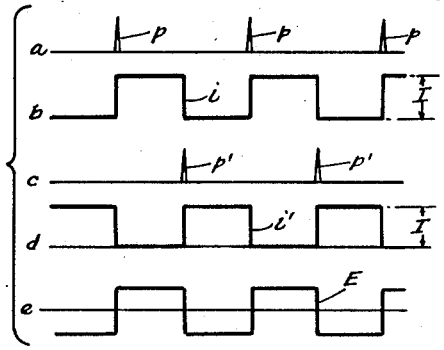
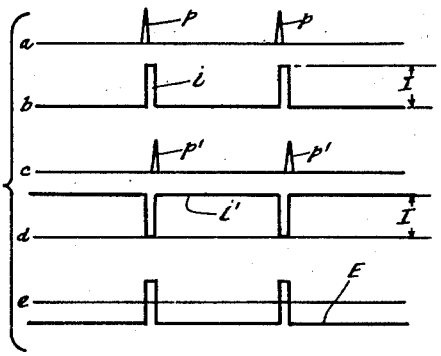
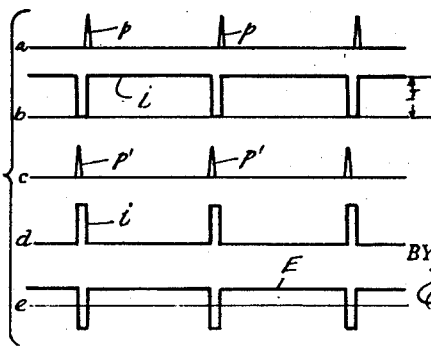
INVENTOR.
Paul Glass
BY Ernest A. Wegner
his atty.

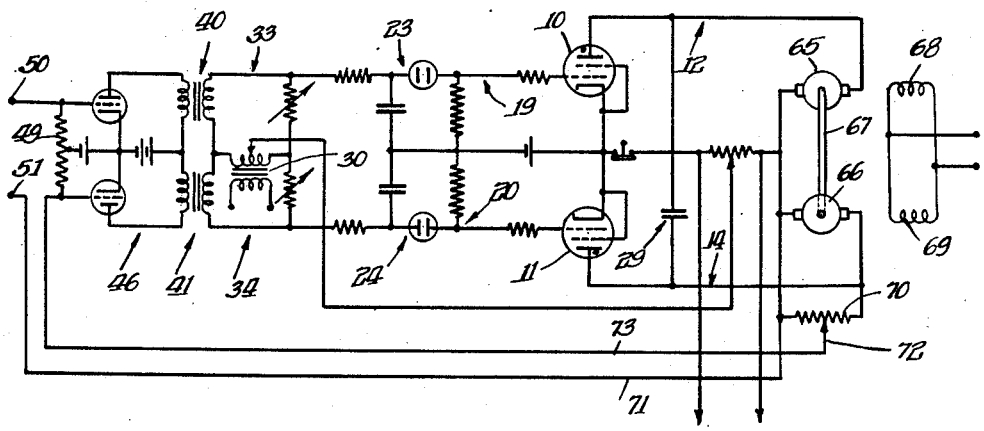

Patented Apr. 19, 1949

2,467,974

UNITED STATES PATENT OFFICE 2,467,974

ELECTRICAL CONTROL CIRCUIT

Paul Glass, Chicago, Ill., assignor to Askania Regulator Company, Chicago, Ill., a corporation of Illinois Application May 19, 1944, Serial No. 536,343

20 Claims. (Cl. 318—345)

The invention relates generally to electrical control circuits and more particularly to electrical control circuits employing gaseous discharge electron tubes.

Electrical control circuits employing gaseous discharge electron tubes frequently employ an alternating current source for supplying the anode voltage of the tubes and an alternating or direct current signal for the grid. As a result, when the signal is such as to cause firing of the tubes, pulses of unidirectional current are supplied to the load in the anode circuit, the fundamental frequency of these pulses being the frequency of the anode voltage source, usually 60-cycles. This comparatively low pulse frequency may be disadvantageous in a number of applications. Another disadvantage is that the average plate current at maximum output is only approximately one-third of the peak value of the tube current. Further the direct current component of the anode current is not directly proportional to the applied control signal.

It is a general object of the invention, therefore, to provide a new and improved control circuit employing gaseous discharge tubes overcoming the disadvantages of former circuits of like character.

A more particular object is to provide an improved gaseous discharge tube circuit employing a direct current source for supplying the anode potential for the tubes and an alternating current source for determining the frequency only of the unidirectional pulse discharges of the tubes.

Another object is to provide an improved gaseous discharge tube circuit in which the average anode current can be made to approach closely the peak value of the current with the circuit output closely approximating a direct current.

Another object is to provide an improved circuit of the character described in which the control signal is a direct current and in which the direct current component of the output is directly proportional to the magnitude of the control signal so as to have, in effect, a direct current amplifying system.

Still another object is to provide an improved circuit having a pair of gaseous discharge tubes in which the circuit embodies such elements and is so arranged that the average output current of the tubes may be varied inversely one with respect to the other with change in the magnitude of a control signal.

A further object is to provide an improved circuit having a pair of gaseous discharge tubes and operable to govern the speed and direction of rotation of a shaft common to the armatures of a pair of motors, the armatures of which are connected one in the anode circuit of each tube.

Other objects and advantages will become apparent from the following detailed description taken in connection with the accompanying drawings, in which:

Fig. 1 is a diagrammatic circuit showing one embodiment of my invention.

Fig. 2 and its subfigures $a$ to $e$, inclusive, illustrate the nature of the currents obtained in certain portions of the circuit and the voltage across the output terminals of the circuit with certain phase relationship of operation initiating pulses.

Fig. 3 and its subfigures $a$ to $e$, inclusive, illustrate the nature of the currents obtained in certain portions of the circuit and the voltage across the output terminals of the circuit with a different phase relationship of operation initiating pulses.

Fig. 4 and its subfigures $a$ to $e$, inclusive, illustrate the nature of the currents obtained in certain portions of the circuit and the voltage across the output terminals of the circuit with a still different phase relationship of operation initiating pulses.

Fig. 5 is a circuit diagram showing another embodiment of my invention.

Fig. 6 is a circuit diagram showing a third embodiment of my invention.

Fig. 7 is a partial circuit diagram showing application of the signal directly to the saturable reactors.

While the invention is herein shown and will hereinafter be described in three embodiments, it is not intended that the invention is to be limited thereby to the specific disclosures made. Nor is it intended that the application of the basic circuit is to be limited to the three applications or adaptations shown. On the contrary, it is intended to cover all modifications, all adaptations and alternative constructions falling within the spirit and scope of the invention as defined in the appended claims.

Fundamental to the invention in the three embodiments here disclosed, and other applications thereof, is a basic circuit which comprises generally a pair of electron tubes of the gaseous discharge type. The anode voltages for these tubes are provided by a direct current source in order that the anode currents of the tubes during the period of firing may have a constant value and so that the tubes, once fired, will continue to fire until arrested by controlled means provided for that purpose. The tubes are normally prevented from firing by a suitable negative bias potential, with firing of the tubes initiated by means momentarily changing the grid potential so as to initiate firing. The arresting means is of such character and is so connected in circuit that it functions to arrest the firing of one tube simultaneously with the commencement of firing of the other tube so that a rectangular wave form of anode current and of output voltage is obtained. Cyclical means is provided for periodically causing production of the momentary changes in potential of the grids of the tubes causing firing of the tubes, and further means is provided for controlling and varying relative to one another, within each cycle, the firing pulse for the tubes, so that the length of firing of each tube may be controlled and varied whereby the various results hereinafter more particularly described may be obtained. The last mentioned means is herein so constructed that it may be controlled by a direct current signal and thus the circuit may be adapted to function as a direct current amplifier, as a direct current motor control, as a force measuring system, and a variety of other applications which will with this disclosure become apparent to those skilled in the art.

More particularly, this basic circuit comprises a pair of electron tubes 10 and 11 of the gaseous discharge type. Each of these tubes has at least an anode 10a and 11a, respectively, a cathode 10b and 11b, respectively, and a control grid 10c and 11c, respectively. The tube 10 has an anode circuit, generally designated 12, which includes a load device 13 taking the form of a resistance, as illustrated in Fig. 1, and a direct current potential common to the two tubes. The tube 11, likewise, has an anode circuit, generally designated 14, which includes a load device 15, again shown in Fig. 1 as a resistance of the same value as the resistance 13, and including the common direct current potential. Herein the direct current potential is obtained from a direct current source of suitable voltage, not here shown, which potential is by leads 16 applied to a resistor 17 connected in a lead 18 constituting a common portion of the anode circuits 12 and 14.

Each of the tubes 10 and 11 has a grid circuit, generally designated 19 and 20, respectively, with a resistance 26 and a lead 21 common to both circuits and including a common negative bias potential 22 which is of a value normally to prevent firing of the tubes. While the grid bias potential 22 is herein shown as a single means common to the two tubes, it is commonly known to those skilled in the art that separate means might readily be provided so long as they bias the tubes equally. Each grid circuit, moreover, includes means, generally designated 23 and 24, operable momentarily to give to the grid such potential as will result in the initiation of firing of the tube. The means 23 and 24 will for convenience be hereinafter referred to as pulse generating means, and these means should be designed to produce as sharp a pulse as possible. While a variety of means might be provided to generate the pulses, each pulse generating means here disclosed, by way of example, comprises a glow tube 25, a condenser 27 and, of course, some suitable source of potential which will hereinafter be more fully disclosed. As clearly seen in Fig. 1, the condenser and the glow tube are connected in parallel, with the glow tube connected in series with the resistance 26 when considered with reference to the potential source for the pulse generating means. Preferably there is also incorporated in each grid circuit an additional resistance 28 interposed between the grid and the pulse generating means.

The tubes are intended to fire alternately with the one tube ceasing firing immediately upon commencement of firing of the other tube. Such tube firing arresting means is herein provided and takes the form of a capacitor 29 connected between the anodes 10a and 11a of the tubes and operating on the well known theory of parallel invertor circuits to extinguish the one tube simultaneously with commencement of firing of the other tube, regardless of which tube is firing and which is commencing to fire.

Cyclical means is provided for determining the frequency of operation of the pulse generating means 23 and 24. This means herein comprises a transformer 30 having a primary winding 31 and a secondary winding 32. The primary winding may be connected to an alternating current source that will provide the frequencies desired and may range from the conventional 60-cycle commercial source to a small oscillator producing any higher frequency up to the limit determined by the characteristics of the tubes, since no power is required and all that is needed is a small control voltage.

Interposed between this frequency control means and the pulse generating means is means for adjusting the phase of the pulses of the pulse generating means relative to the control voltage and relative to one another. While this phase shifting means might take a variety of forms, including a means capable of shifting the phase of the pulses of one of the pulse generating means through substantially 360°, it is preferable to provide a pair of phase shifting means, generally designated 33 and 34, one interposed between the frequency control source and each pulse generating means, so that the phase of the pulses of each pulse generating means may be initially adjusted with respect to the control voltage. Herein the phase shifting means 33 and 34 are similar, adapted to shift the phase of the pulse generating means associated therewith through a range of substantially 0° to 180°, and the phase shifting means are, moreover, so controlled as to change the phase of the pulses of the pulse generating means over which they exercise control simultaneously but in opposite directions. Each phase shifting means herein comprises a variable resistance 35 and an inductance coil 36 connected in series across the secondary winding 32 of the transformer 30. The common terminal of the resistance and the inductance is by a lead 37 connected to the grid circuit at a point intermediate the condenser 27 and the glow tube 25. Preferably a resistance 38 is incorporated in the lead 37.

Preferably a bias voltage is applied to the glow lamps 25 which is just slightly lower than the extinction voltage of the glow lamps. With such bias voltage present, only a small control voltage is required from the phase shifting means and the voltage to be supplied from the frequency control transformer 30 can be kept low. Herein such bias voltage is obtained from the resistor 17, acting as a potentiometer, by a lead 39 connected at one end to the midpoint of the transformer secondary winding 32 and at the other end connected to the resistor 17 at a point giving the desired bias voltage for the glow lamps. This arrangement has the additional advantage that it suppresses the negative pulses of the pulse generating means so that only one positive pulse is produced during every cycle of the control frequency.

Herein means is provided whereby control of the phase shifting means is in response to a direct current signal and, moreover, is in response to the magnitude of such direct current signal. To that end, the coil 36 of each of the phase shifting means 33 and 34 constitutes the secondary winding of a saturable reactor, generally designated 40 and 41, respectively. The primary winding of these saturable reactors is formed by a coil 42 and 43, respectively, constituting the load in the plate circuit of vacuum tubes 44 and 45. The tubes 44 and 45 are part of a conventional amplifier, generally designated 46, and having, in addition to the tubes, a common direct current potential 47 supplying the plate voltage for the tubes, a common negative grid bias potential 48 and a resistance 49 connected half in each grid circuit. The amplifier has signal input terminals 50 and 51 and the circuit as a whole may be said to have output terminals 52 and 53.

For a better understanding of the invention, the operation of the basic circuit described will be given. For each cycle of the control frequency each pulse generating means will generate a single positive pulse. The pulses so generated by the pulse generating means 23 are shown in Fig. 2a at $p$, while the pulses generated by the pulse generating means 24 are shown in Fig. 2c at $p'$. If it is assumed that the phase shifting means 33 and 34 are so adjusted that the series of pulses $p$ and the series of pulses $p'$ are 180° out of phase, as shown in Fig. 2, then each tube will fire for one-half of each cycle of the control frequency. Assuming tube 10 to be the first to fire, the current $i$, having the constant value I, will flow in the anode circuit 12 of the tube 10 for one-half cycle of the control frequency. At the end of that half cycle, pulse $p'$ will initiate firing of the tube 11, whereupon capacitor 29 will immediately extinguish tube 10. The current $i'$ (Fig. 2d) will then flow in the anode circuit 14 for the balance of the cycle, such current flow ceasing at the end of a half cycle because the successive pulse $p$ of the pulse generating means 23 is now generated to initiate firing of the tube 10 with the capacitor 29 again acting to arrest firing of the other tube, in this instance the tube 11. Where the values of the anode circuits 12 and 13 are identical, the values of the currents $i$ and $i'$ will be the same and the currents will be unidirectional currents having a square wave form, as shown respectively in Fig. 2b and Fig. 2d. The voltage measured between the anodes of the tubes is an alternating square wave E having no direct current component, as shown in Fig. 2e.

If it now be assumed that the phase shifting means 33 and 34 be so adjusted that the pulses $p$ of the pulse generating means 23 are retarded in phase by approximately 90°, as shown in Fig. 3a, while the pulses $p'$ of the pulse generating means 24 are advanced in phase through substantially 90°, as shown in Fig. 3c, the pulses $p'$ will, of course, follow immediately upon the pulses $p$. As a consequence, tube 10 will barely fire before it is extinguished because of the commencement of firing of tube 11. This latter tube, however, will now fire through substantially 360°. The result, of course, is that the current $i$ (Fig. 3b), though having the same constant value I, will flow for a very brief period, whereas the current $i'$ (Fig. 3d) will flow for the balance of each cycle resulting in currents of rectangular wave form shown, respectively, in Fig. 3b and Fig. 3d. The current $i'$ is thus substantially a direct current of the value I, except for the short interruptions resulting from the brief firing of the tube 10. The voltage as measured between the anodes of the tubes is, as clearly seen in Fig. 3e, substantially a negative direct current voltage, again with the small interruptions resulting from firing of the tube 10. The constant portion of the voltage has a value equal to that of the anode voltage source 16 less the tube drop.

If now it be assumed that the phase shifting means 33 and 34 be adjusted to produce just the opposite phase shift from the condition illustrated in Fig. 2, as was obtained by the adjustment assumed for Fig. 3, then conditions reverse of those illustrated in Fig. 3 are obtained. The pulses $p$ will now follow immediately the pulses $p'$, with the result, as shown in Fig. 4, that the tube 11 will fire only momentarily while the tube 10 will fire through the major portion of each cycle of the control frequency. The results, as already stated, are the opposite of that obtained for the immediately previously assumed condition, with the voltage between the anodes of the tubes being substantially a positive direct current voltage. Obviously, by adjustment of the phase of the series of pulses with respect to each other, any desired condition may be obtained between the extremes illustrated in Fig. 3 and Fig. 4, with the values of average output current and average output voltage varying as straight line functions of the phase displacement between the two pulse series or groups. What is more important, the direct current component of the output is proportional to the phase shift and hence to the magnitude of the signal, and, by the employment of a filter or high control frequency, an output is obtainable in which the alternating current component is completely eliminated or so negligible as not to affect a large majority of devices. The closeness with which the phase displacement may approach 0° or 360° with this circuit arrangement is dependent upon the width or sharpness of the pulses and the deionization time of the tubes. It has been found by experimentation, however, that phase displacements within three per cent of 0° or 260° are readily obtainable. Should, as a result of excessive phase shift, both tubes fire simultaneously, the circuit is readily restored to normal by the employment of some means for arresting the firing of one or both of the tubes. This means may take the form of a normally closed switch 55 interposed in the common lead 18 of the anode circuits. This switch might readily be actuated automatically by a relay connected in the lead 18 and operating to open the switch 55 when the current flowing in the lead 18 rises from the value I to the value 2I.

It is believed readily apparent from the foregoing that, if the phase shifting means 33 and 34 are adjusted intially to provide a given phase displacement between the pulses of the pulse generating means for a given signal, departure of the signal from that given value will, through the amplifier, cause the phase displacement of the pulses of the pulse generating means to change and thus produce a change in the average anode current of the tubes and in the average value of the voltage measured across the output terminals 52 and 53 of the circuit including, under proper conditions, a change in sign. If, for example, the phase shifting means are so adjusted that for a signal voltage of average value the pulses of the two phase generating means are spaced 180°, as shown in Fig. 2, then a change in the value of the signal voltage will bring about a proportional change in the average current flowing in the anode circuits of the tubes 10 and 11. Thus, upon an increase in the value of the signal voltage, the saturable reactors, acting on and through the phase shifting means, would advance the phase of the pulses of the pulse generating means 23 and retard the phase of the pulses of the pulse generating means 24 simultaneously and by proportional and increasing amounts as the signal voltage increased resulting in a larger average $i$ current, in a smaller average $i'$ current, with a corresponding larger average positive voltage measured across the output terminals 52 and 53. Conversely, if the value of the signal voltage drops below the given value, the phase of the pulses of the pulse generating means will be changed in the opposite direction resulting in a greater average current flowing in the anode circuit of the tube 11, a smaller average current flowing in the anode circuit of the tube 10, with a corresponding negative voltage as measured across the terminals 52, 53 of the circuit.

Referring now exclusively to Fig. 1, the basic circuit hereofore described is in Fig. 1 adapted for use as a direct current amplifier. To that end, there is connected to the output terminals 52 and 53 a filter circuit 56 of any conventional construction, herein represented merely by a rectangle and designated generally as 56. To adapt the circuit to function as a direct current amplifier, the phase shifting means 33 and 34 should be so adjusted that at no signal voltage the pulses of the pulse generating means 23 and 24 are 180° out of phase, so that the average output voltage will be zero. With the application of a signal to the input terminals 50, 51, the average output voltage will increase in a positive direction as the signal voltage increases if the signal is so applied that the terminal 50 is positive, and will increase in a negative direction if the polarity of the signal is reversed, the filter circuit 56 removing practically all of any alternating current component that may be present at the terminals 52, 53. If desired, a part of the output voltage may be connected in a negative feedback circuit to oppose the original input signal, thus providing for high stability and linearity of the circuit as a whole. To that end, a potentiometer 57 is connected across the output leads of the filter circuit 56 with the movable contact 58 of the potentiometer connected by a lead 59 to the signal input terminal 51, and with the fixed contact of the potentiometer connected by a lead 60 to the end of the resistance 49 which would normally be connected to the input terminal 51.

Referring now exclusively to Fig. 5, which discloses the basic circuit hereofore described as adapted for a direct-current-signal controlled motor speed and direction control system: The basic circuit is identical with the basic circuit heretofore described save that the resistances 13 and 14, constituting the load devices in Fig. 1, have been replaced, respectively, by the armatures 65 and 66 of shunt wound direct current motors. The armatures are mounted on a common shaft 67. The motors are completed by field windings 68 and 69 energized from a suitable direct current source. The armatures and field windings are, of course, so arranged that one motor tends to rotate the shaft 67 in one direction, while the other motor tends to rotate the shaft in the opposite direction. The motor speed, as will presently become more apparent, is proportional to the magnitude of the signal voltage applied to the terminals 50, 51, while the direction of rotation is determined by the sign of the signal voltage, the signal being a direct current signal. Herein the phase shifting means 33 and 34 are so adjusted that at no signal the currents flowing through the armatures 65 and 66 will be equal, and hence no rotation will take place because the forces cancel out. With an application of a signal of successively increasing magnitude, it is apparent that the one tube, as previously described, will fire for progressively increasing lengths of time, while the other tube will fire for shorter periods of time, and hence the one motor will have a current of increased average value flowing through the armature thereof and hence the speed of rotation of the shaft 67 will increase and will run at a fixed rate proportional to the magnitude of the signal voltage. If now the signal is reversed in sign, the other armature will have the larger current flowing therethrough and hence the direction of rotation of the shaft 67 will be reversed with the speed of rotation again determined by the magnitude of the signal voltage. Though the motors should have the same favorable shunt wound characteristics which they have under ordinary conditions, it is desirable to provide a negative feedback circuit so as to establish a definite relation between the input signal and motor speed which will be maintained independently of variations of load on the motors. To that end, a potentiometer 70 is connected across the armature 66. The fixed terminal of the potentiometer is by a lead 71 connected to the input terminal 51, while the adjustable contact 72 thereof is by a lead 73 connected to the end of the resistance 49 which would, save for the negative feedback, be connected to the input terminal 51.

Referring now primarily and exclusively to Fig. 6, the basic circuit heretofore described is in this figure disclosed as adapted for use in a force measuring system. Here again the basic circuit is identical with that initially described, save that the resistances 13 and 15 forming the load devices in the circuit of Fig. 1 are replaced by coils 75 and 76, respectively. Each of the coils 75 and 76 is wound in the form of an annulus and the coils are mounted coaxially and in end to end relationship on a displaceable member 77 having a normal position and adapted to be displaced from that normal position by an external force. The coils are mounted between the poles of a permanent magnet 78 having the shape of a three in diametrical cross section and the coils are so wound that current flowing in the one tends to restore the displaceable member to its normal position when displaced in one direction, while current flow in the other coil tends to restore the displaceable member to normal position when displaced in the opposite direction.

Also forming a part of this force measuring system is a signal generating means, generally designated 79, of a character capable of generating a signal proportional to the amount of displacement of the member 77 from its normal position. Herein such a signal generating means takes the form of a light source 80, appropriate lenses 81 and a photoelectric cell 82 connected through an amplifier 86 and thus by leads 83 to the input terminals 50 and 51. The displaceable member 77 has a portion 84 disposed so as to be operable to control the amount of light striking the photoelectric cell in accordance with the displacement of the member from normal position. In this embodiment, the phase shifting means would again be so adjusted that for the signal applied to the input terminals 50, 51 when the displaceable member is in normal position the current flowing through the coils 75 and 76 would be equal. Under these circumstances, as the displaceable member is moved from its normal position in either direction, the changed quantity of light striking the photoelectric cell would produce a signal of different magnitude, which in turn would so shift the phase of the pulses of the pulse generating means as to produce in the coils a changed current flow such that the reaction between the coils and the permanent magnet would just equal the external force tending to displace the member 77. Inasmuch as the voltage across the output terminals 52, 53 is directly proportional to the difference in the average current flowing in the coils, and inasmuch as that current difference in turn is proportional to the counteracting force, which in turn is equal to the externally applied force, the voltage is directly proportional to the applied force and the applied force may readily be indicated by a voltmeter 85 connected across the output terminals 52, 53 and calibrated in terms of force instead of volts.

While it is generally preferable, if not actually necessary, to employ means for amplifying the input signal, and while in each of Figs. 1, 5 and 6 herein an amplifier 46 is shown, the impression is not to be formed that such an amplifier is absolutely essential to the proper operation of the circuits of this invention. On the contrary, the signal might be applied directly to the coils 42 and 43 forming the primary windings of the saturable reactors 40 and 41, respectively. This could be accomplished as shown in Fig. 7 and is equivalent to the input arrangement of Figs. 1, 5 and 6 with the vacuum tubes 44 and 45 and the negative bias potential 48 eliminated. More particularly, the input circuit would still include a resistor 49' connected between the input terminals 50 and 51. The terminal 50 is, as shown, connected to one end of the primary winding 42, while the terminal 51 is connected to one end of the primary winding 43. The common terminal of the windings 42 and 43 is connected to the positive terminal of a battery 47', while the negative terminal of the battery is connected to the midpoint of the resistor 49'.

It is believed apparent from the foregoing that I have perfected a novel and improved circuit for utilizing direct current signals as control signals, and, more particularly, a circuit for amplifying direct current. The circuit herein disclosed and claimed not only is adaptable to amplify direct current but is utilizable to control, inversely to one another, the flow of amplified current in a pair of load devices, thus adapting the circuit not only for amplification purposes, but for control purposes as well. Adaptation of the circuit for the many control purposes possible will, it is believed, be apparent from the disclosures made herein, particularly in Figs. 5 and 6 hereof.

By the terms "common direct current potential," "common negative bias potential," and "alternating current source common to said pulse generating means," as herein employed in the specification and claims, is not so much meant that there is a single potential source or alternating current source, but that the potentials or the currents provided the various plate or grid circuits are the same. Thus a pair of identical potential sources substituted for a single source herein shown or claimed and connected to function in the same manner would be a common source as that term is here employed and intended to be interpreted.

I claim as my invention:

1. An electrical circuit comprising a pair of gaseous discharge electron tubes each having a cathode, an anode and a grid, an anode circuit for each tube including a load device and a common direct current potential, a grid circuit for each tube including a common negative bias potential normally preventing firing of said tubes and means in each grid circuit operable momentarily to change the grid potential to initiate firing of the tube, means operable to arrest firing of one of said tubes upon commencement of firing of the other, cyclical means determining the frequency of initiation of firing of said tubes, and means for controlling the relative time of firing of each tube within each cycle operable to obtain a firing period varying from a firing of one of said tubes for substantially the entire cycle of said cyclical means to a firing of the other tube for substantially the entire cycle of said cyclical means to obtain an output of the same frequency as said cyclical means.

2. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means to change the phase of the pulses of said pulse generating means associated therewith, said phase shifting means being jointly operable to change the phase of the pulses of said pulse generating means through substantially 360° of the cycles of said alternating current source, and means exercising control over both said phase shifting means to bring about any desired phase relationship between the pulses of said pulse generating means.

3. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, and means exercising control over both phase shifting means causing the same simultaneously and equally but oppositely to shift the phase of the pulses of said pulse generating means relative to one another.

4. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means to change the phase of the pulses of said pulse generating means associated therewith, said phase shifting means being jointly operable to change the phase of the pulses of said pulse generating means through substantially 360°, and means operable in response to an electrical input signal shifting the phase of the pulses of said pulse generating means relative to one another by amounts proportional to the magnitude of the signal.

5. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, and means operable in response to an electrical input signal simultaneously and equally but oppositely shifting the phase of the pulses of said pulse generating means relative to one another by amounts proportional to the magnitude of the signal.

6. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of the pulse generating means associated therewith, and means operable in response to a direct current input signal simultaneously and equally but oppositely shifting the phase of the pulses of said pulse generating means relative to one another by amounts proportional to the magnitude of the signal.

7. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, a saturable reactor electrically associated with each phase shifting means including a coil forming a part of the phase shifting means with which it is associated, and means electrically associated with said saturable reactors operable in response to a direct current signal voltage of varying magnitude to effect said reactors equally but oppositely to effect a corresponding relative phase displacement between the pulses of said pulse generating means.

8. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, a saturable reactor electrically associated with each phase shifting means including a coil forming a part of the phase shifting means with which it is associated, and an amplifying circuit connected with said saturable reactors operable in response to a direct current signal voltage of varying magnitude equally but oppositely to vary the saturation thereof thereby effecting a corresponding relative phase displacement between the pulses of said pulse generating means.

9. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, a saturable reactor electrically associated with each phase shifting means including a coil forming a part of the phase shifting means with which it is associated and a second coil, and an amplifying circuit comprising a first and a second vacuum tube each having a cathode, an anode and a grid, an anode circuit for each vacuum tube including said second coil and a common direct current potential, and a grid circuit for each vacuum tube including a common negative bias potential and a divided resistance across which a direct current signal voltage is to be applied.

10. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, said pulse generating means firing when the voltage applied thereto exceeds its starting voltage, means for applying a bias voltage to said pulse generating means slightly below the extinction voltage thereof, an alternating current source common to said pulse generating means for supplying the additional voltage required to initiate firing of said pulse generating means, a phase shifting means connected between said alternating current source and each pulse generating means operable to change the phase of the pulses of said pulse generating means associated therewith, and means exercising control over both phase shifting means causing the same simultaneously and equally but oppositely to shift the phase of the pulses of said pulse generating means relative to one another.

11. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a common negative bias potential and a pulse generating system including a glow lamp, an input transformer for the pulse generating systems having a primary and a secondary winding, means for applying a bias voltage to said glow lamps slightly below the extinction voltage thereof including a lead connected at one end to said first mentioned direct current potential to take off a desired voltage and connected at the other end to the midpoint of the secondary winding of said input transformer, a phase shifting means connected between said transformer and each pulse generating system operable to change the phase of the pulses of each pulse generating system, and means simultaneously and equally but oppositely shifting the phase of the pulses relative to one another.

12. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of the pulse generating means associated therewith, means operable in response to a direct current input signal simultaneously and equally but oppositely shifting the phase of the pulses of said pulse generating means relative to one another by amounts proportional to the magnitude of the signal, and a filter circuit connected across the anodes of said tubes.

13. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of the pulse generating means associated therewith, means operable in response to a direct current input signal simultaneously and equally but oppositely shifting the phase of the pulses of said pulse generating means relative to one another by amounts proportional to the magnitude of the signal, and a negative feedback circuit connected to oppose the input signal with a portion of the output voltage.

14. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means operable to change the phase of the pulses of said pulse generating means associated therewith, a saturable reactor electrically associated with each phase shifting means including a coil forming a part of the phase shifting means with which it is associated and a second coil, an amplifying circuit comprising a first and a second vacuum tube each having a cathode, an anode and a grid, an anode circuit for each vacuum tube including said second coil and common direct current potential, a grid circuit for each vacuum tube including a common negative bias potential and a divided resistance across which a direct current signal voltage is to be applied, and a negative feedback circuit including a potentiometer connected across the output terminals of the system and leads connecting the variable portion of the potentiometer in series with the resistance of said amplifying circuit.

15. In combination with a pair of direct current motors having a their armatures on a common shaft, a direct-current-signal-controlled control system comprising a pair of gaseous discharge electron tubes each having a cathode, an anode and a grid, an anode circuit for each tube including the armature of one of said motors and a common direct current potential supplying the anode voltage for said tubes, the armatures being connected to tend to run in opposite directions, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means to change the phase of the pulses of said pulse generating means associated therewith, said phase shifting means being jointly operable to change the relative phase of the pulses of said pulse generating means through substantially 360° and thereby control the speed of rotation of the common shaft of said motors, and means operable in response to an electrical input signal shifting the phase of the pulses of said pulse generating means relative to one another by amounts proportional to the magnitude of the signal.

16. In combination with a pair of shunt wound, direct current motors having their armatures on a common shaft and a direct current source for the shunt windings of the motors, a direct-current-signal-controlled control system comprising a pair of gaseous discharge electron tubes each having a cathode, an anode and a grid, an anode circuit for each tube including the armature of one of said motors and a common direct current potential supplying the anode voltage for said tubes, the armatures being connected to tend to run in opposite directions, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, a phase shifting means connected between said alternating current source and each pulse generating means to change the phase of the pulses of said pulse generating means associated therewith, said phase shifting means being jointly operable to change the phase of the pulses of said pulse generating means through substantially 360° and thereby control the speed of rotation of the common shaft of said motors, and means operable in response to a direct current input signal to govern the speed of rotation of the common shaft of said motors in proportion to the magnitude of the signal by shifting the phase of the pulses of said pulse generating means and operable in response to a reversal of the signal to control the direction of rotation of the common shaft of said motors.

17. In combination with a pair of direct current motors having their armatures on a common shaft, a direct-current-signal-controlled control system comprising a pair of gaseous discharge electron tubes each having a cathode, an anode and a grid, an anode circuit for each tube including the armature of one of said motors and a common direct current potential supplying the anode voltage for said tubes, the armatures being connected to tend to run in opposite directions, means operable to arrest firing of one of said tubes upon commencement of firing of the other, a grid circuit for each tube including a pulse generating means and common negative bias potential, an alternating current source common to said pulse generating means for controlling the frequency of the pulses of said pulse generating means, a phase shifting means connected between said alternating current source and each pulse generating means to change the phase of the pulses of said pulse generating means associated therewith, said phase shifting means being jointly operable to change the relative phase of the pulses of said pulse generating means through substantially 360° and thereby control the speed of rotation of the common shaft of said motors, means operable in response to an electrical input signal shifting the phase of the pulses of said pulse generating means relative to one another by amounts proportional to the magnitude of the signal, and means feeding back into said last mentioned means a portion of the voltage across one of the motor armatures including a potentiometer.

18. An electrical control system comprising a pair of gaseous discharge electron tubes each having a cathode, an anode and a grid, an anode circuit for each tube including a load device and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, means operable in response to an electrical input signal to shift the phase of the pulses of said pulse generating means relative to one another by amounts proportional to the magnitude of the signal to increase the average current flow in one of said load devices and decrease the average current flow in the other of said load devices, a signal generating means, and a displaceable member having a normal position and having a first portion cooperating with said signal generating means to govern the magnitude of the signal generated in proportion to the displacement of said member from its normal position and a second portion acted upon by said load devices in a direction tending to restore said member to its normal position.

19. An electrical control system comprising a pair of gaseous discharge electron tubes each having a cathode, an anode and a grid, an anode circuit for each tube including a coil and a common direct current potential, means operable to arrest firing of one of said tubes upon commencement of firing of the other, a grid circuit for each tube including a pulse generating means and a common negative bias potential, an alternating current source common to said pulse generating means for controlling the frequency of the pulses of said pulse generating means, means operable in response to an electrical input signal to shift the phase of the pulses of said pulse generating means relative to one another by amount proportional to the magnitude of the signal to increase the average current flow in one of said coils and decrease the average current flow in the other of said coils, a signal generating means, a permanent magnet, and a displaceable member mounting said coils between the poles of said magnet with the reactions between said coils and said magnet tending to displace said member in opposite directions from a normal position, said displaceable member having a portion cooperating with said signal generating means to govern the magnitude of the signal generated in accordance with displacement of said member from its normal position.

20. An electrical circuit comprising a pair of gaseous discharge electron tubes each having a cathode, an anode and a grid, an anode circuit for each tube including a load device and a common direct current potential, a grid circuit for each tube including a common negative bias potential normally preventing firing of said tubes and pulse generating means in each grid circuit operable momentarily to change the grid potential to initiate firing of the tube, means operable to arrest firing of one of said tubes upon commencement of firing of the other, an alternating current source determining the frequency of pulse generation by said pulse generating means, a phase shifting means between said alternating current source and each pulse generating means, and means responsive to the magnitude of a signal operable to change the phase of the pulses of said pulse generating means relative to one another to increase the firing time of one and decrease the firing time of the other of said tubes.

PAUL GLASS.

REFERENCES CITED

The following references are of record in the file of this patent:

UNITED STATES PATENTS

| Number | Name | Date |
| --- | --- | --- |
| 2,059,562 | Curtis et al. | Nov. 3, 1936 |
| 2,173,740 | Wilder | Sept. 19, 1939 |
| 2,280,949 | Hall | Apr. 28, 1942 |
| 2,292,100 | Bliss | Aug. 4, 1942 |
| 2,309,525 | Mohr | Jan. 26, 1943 |
| 2,359,649 | Kahnetal | Oct. 3, 1944 |

Certificate of Correction

Patent No. 2,467,974.　　　　　　　　　　　　　　　　　　April 19, 1949.

PAUL GLASS

It is hereby certified that errors appear in the printed specification of the above numbered patent requiring correction as follows:

Column 6, line 49, for "260°" read *360°*; line 64, for "intially" read *initially*; column 7, line 61, for "hereofore" read *heretofore*; column 9, line 36, for "tot he" read *to the*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*